US012687830B2

(12) United States Patent
Walter et al.

(10) Patent No.:  US 12,687,830 B2
(45) Date of Patent:      Jul. 21, 2026

(54) PROCESS CONTROL SYSTEM, APPARATUS AND METHOD FOR CONTROL OF A PROCESS PLANT

(71) Applicant: Siemens Aktiengesellschaft, Munich (DE)

(72) Inventors: Maximilian Walter, Nuremberg (DE); Ulrich Taschke, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 321 days.

(21) Appl. No.: 18/342,901

(22) Filed: Jun. 28, 2023

(65) Prior Publication Data

US 2024/0004360 A1      Jan. 4, 2024

(30) Foreign Application Priority Data

Jul. 1, 2022    (EP) ..................................... 22182570

(51) Int. Cl.
*G06F 21/64* (2013.01)
*G05B 15/02* (2006.01)
*G05B 19/042* (2006.01)

(52) U.S. Cl.
CPC ......... *G05B 15/02* (2013.01); *G05B 19/0428* (2013.01); *G05B 2219/23464* (2013.01); *G05B 2219/24008* (2013.01)

(58) Field of Classification Search
USPC .......................................................... 700/28
See application file for complete search history.

(56) References Cited

U.S. PATENT DOCUMENTS

| | | | |
|---|---|---|---|
| 11,169,501 B2 | 11/2021 | Walter | |
| 2007/0198423 A1 | 8/2007 | Carbone et al. | |
| 2009/0249034 A1* | 10/2009 | Sato ...................... | G06F 11/181 |
| | | | 712/214 |
| 2012/0005560 A1* | 1/2012 | Steiner ................ | H03M 13/152 |
| | | | 714/780 |
| 2013/0262938 A1* | 10/2013 | Schmitt ................. | H03M 13/49 |
| | | | 714/48 |
| 2013/0318327 A1* | 11/2013 | Gammel ............. | G06F 11/0763 |
| | | | 712/220 |
| 2014/0257529 A1 | 9/2014 | Dicaire et al. | |
| 2018/0210428 A1* | 7/2018 | Jundt ................. | G05B 19/4186 |
| 2018/0293164 A1 | 10/2018 | Perez et al. | |
| 2019/0354675 A1* | 11/2019 | Gan .................... | G06F 11/0712 |
| 2021/0278816 A1 | 9/2021 | Schweiker et al. | |
| 2023/0273591 A1* | 8/2023 | Bliefert .............. | G05B 19/4155 |
| | | | 700/28 |
| 2023/0305911 A1* | 9/2023 | Witte .................. | G06F 11/0793 |

FOREIGN PATENT DOCUMENTS

| | | |
|---|---|---|
| CN | 104049579 | 9/2014 |
| DE | 102010037457 | 3/2012 |
| DE | 102018120347 | 2/2020 |
| EP | 3975016 | 3/2022 |

OTHER PUBLICATIONS

EP Search Report dated Dec. 15, 2022 based on EP22182570 filed Jul. 1, 2022.

* cited by examiner

*Primary Examiner* — Emilio J Saavedra
(74) *Attorney, Agent, or Firm* — Cozen O'Connor

(57) ABSTRACT

An apparatus and method for controlling a process plant in which a number of control processes are performed on common hardware, wherein encoded process variables are encoded in each of the control processes based on signatures that are defined individually in each of the control processes.

12 Claims, 2 Drawing Sheets

PROCESS CONTROL SYSTEM, APPARATUS AND METHOD FOR CONTROL OF A PROCESS PLANT

BACKGROUND OF THE INVENTION

1. Field of the Invention

The present invention relates to an apparatus and method for control of a process plant, and also relates to a process control system with such an apparatus for control of the process plant.

2. Description of the Related Art

Conventional industrial plants have previously frequently had automation plant with individual physical controllers. In most recent times, a tendency has been observed for implementing these separate physical controllers of industrial plants on "hyper-convergent" infrastructures. The individual field devices of such a plant can be linked to this infrastructure via a network in such cases. Here, a number of control processes can be performed on a common hardware platform for separate groups of field devices.

Because of safety aspects it must be guaranteed where necessary while the control processes are being performed that the control processes are always accessing the correct data. To this end, for example, security functions can be implemented in order, with the aid of encoded processing, to guarantee the integrity of the data.

For such encoded processing the individual process values can have one or more signatures. For example, a signature can be provided that is assigned in each case to a specific process value. This signature can be created once, during encoding of the control program, for example, and subsequently remains unchanged over time. Such a signature is also referred to, for example, as the "B" signature. Thus, a mixing up of process values can be recognized in a simple way.

A further signature can also be provided, which is the same for all process values, but which changes however during a cyclic processing of a control process in each cycle or execution of a loop. Such a signature might also be referred to as the "D" signature. This signature changes in each cycle or execution of a loop. As a result, outdated process values can be identified with a high level of probability.

The signatures described can be used both in systems with individual physical controllers and also in control processes in a hyper-convergent infrastructure. If a number of identical control processes are to be executed on a common hardware platform in hyper-convergent infrastructures, then for examples software encoded once can be executed a number of times. In other words, a number of instances of the same piece of software can be virtualized a number of times on the same host.

If, however, the same application program encoded once is executed a number of times on a host system, then for example the recognition of a mixing up of process values between the different instances on the basis of the above-mentioned B signature is no longer possible. Instead, the corresponding user programs would have to be individually parameterized and encoded for each instance, here.

SUMMARY OF THE INVENTION

In view of the foregoing, it is an object of the invention to provide an apparatus and method that make it possible to execute a program encoded once a number of times on common hardware, where a sufficiently safe and reliable monitoring of encoded process values can be realized.

This and other objects and advantages are achieved in accordance with the invention by a process control system, a method and apparatus and a for control of a process plant, where the apparatus comprises a control apparatus that is configured to execute a number of control processes on common hardware. Here, each control process performs cyclic processing of at least one process value. The control processes are further configured to compute a first signature for the at least one process value and to perform the processing of the at least one process value while using the computed first signature. The control processes are further configured to compute the first signature while using a prespecified initial value and a cyclic increment. In particular, each of the control processes is configured to define the initial values and/or the cyclic increment of the respective control process individually.

The objects and advantages are also in achieved in accordance with the invention by a process control system. The process control system comprises an inventive apparatus for control of a process plant. The process control system further comprises a number of field devices. Each of the field devices comprises at least one sensor and/or actuator. Here the control processes of the control apparatus are each configured to generate control commands while using sensor values of the field devices and/or to send control commands to the field devices.

The objects and advantages are further achieved in accordance with the invention by a method for control of a process plant. Here, a number of control processes can be implemented in common hardware in a control apparatus. Each control process in this case implements cyclic processing of at least one process value. In accordance with the inventive method, a first signature is computed for the at least one process value in each cycle in each case and the processing of the at least one process value is performed using the computed first signature. The control processes further each compute the first signature while using a predetermined initial value and a cyclic increment. Over and above this, the initial values and/or the cyclic increment of the respective control process are computed individually for each control process.

The present invention is based on the knowledge that, for example, in hyper-convergent infrastructures a number of control processes can be executed on common hardware. To this end, an application program is required for each control process, which must be generated based on a source code. If the parameters for an encoded processing of process values are predetermined in the application program, then under some circumstances it is not possible to distinguish between encoded process values from different software instances if the individual control processes use the same encoded application program.

Against this background, the concept of the present invention is to provide, in an application program generated once, a possibility whereby different control processes are given the capability of distinguishing between encoded process values of different control processes.

The present invention benefits from the fact that the control processes are executed by cyclic processing of a loop, where at least a part of the signature used for encoded process values is dependent on the respective loop pass. In particular, in accordance with the invention, an option in a generated application program is provided, whereby an initial start value or an increment for a loop-dependent creation of a signature can be adjusted individually for an encoded process value. If random values or specific values of the respective control process are used for this adjustment, then in each control process different signatures can be generated for the encoded process values.

As will be explained in greater detail below, different approaches can be used for the choice of the initial start value/or the cyclic increment to obtain values that are as different as possible for the signatures in the control processes.

Thus it is possible to implement on one item of hardware a number of virtual instances for controllers of plant, where for each of the virtual instances the same application program generated once can be used. An adaptation and new generation of the application program is not required in this case. Despite this, due to the individual adaptation for an initial value and/or an increment in the individual application programs, an individual signature is generated for encoded process values in each case. This makes it possible, even with multiple use of an application program generated once, to individually encode process values and to individually distinguish between the encoded process values from the individual application programs.

Since this makes it possible to dispense with the individual parametrizations and translation of the application programs for the individual instances of the control processes, a control system of a hyper-convergent infrastructure of this type, in which a number of control processes are executed as virtual applications on common hardware, can be implemented very easily and quickly.

In accordance with an embodiment, the apparatus for control of the process plant comprises a storage facility. The storage facility is configured to store and provide initial values and/or cyclic increments for the number of control processes on a remanent basis. In other words, the data held in the storage facility for initial values and/or cyclic increments is not lost even during a switch off or outage of the supply voltage. The control processes are configured here, in a first-time initialization, to determine the initial values and/or the cyclic increment and to store them in the storage facility. In other words, the first time that a control process is commissioned/initialized the control processes can determine the initial values and/or the cyclic increment once and subsequently store them in the remanent storage. This data is thus immediately available for a later new start of the system and does not have to be determined once again. In this way, future start processes can be carried out very rapidly.

In accordance with one embodiment, the control processes are configured, in further initializations, to determine the first signature while using the initial value stored in the storage facility for the respective control process and/or a cyclic increment. As already explained previously, in this way future start processes can be performed very rapidly since the data previously determined once is accessed here.

In accordance with an alternate embodiment, the control processes are configured, with each initialization, to newly determine initial values and/or the cyclic increment. Thus, no remanent storage of data for the initial values or the cyclic increment is required. Accordingly, such a setup can be realized especially easily and at especially low cost.

In accordance with another embodiment, the control processes are configured to compute the initial values and/or the cyclic increment of the respective control process using a random value. The random values or pseudo random values required for this can be determined in any given way. For example, an existing software function can be used. Likewise, for example, a determination of a seemingly random value based on a system time or another suitable system or sensor value is possible. The use of such random values or pseudo random values enables different values for the initial values and/or the cyclic increment of the individual control processes to be determined with a high degree of probability.

In accordance with yet another embodiment, the control processes are configured to compute the initial values and/or the cyclic increment of the respective control process using a hardware characteristic and/or a software characteristic of the respective control process. For example, the values can be determined based on an individual license key, an IP address assigned to the control process, a virtual MAC address or any other given software or hardware characteristic, provided these characteristics differ for the individual control processes.

In accordance with a further embodiment, the control processes are each configured to assign a second signature to the at least one process value. Accordingly, the processing of the at least one process value can be performed using the computed first signature and the second signature. The second signature can particularly involve a signature that is the same for all cycles of the cyclic processing. In particular, an individual signature for each process value can be involved here, which however is kept the same for all cycles. Through this, a distinction can be made between different process values.

In accordance with an embodiment, the control apparatus comprises a processing facility and a data memory. This processing facility is configured to perform the number of control processes. The data memory is configured to store the process values of the number of control processes and the corresponding signatures for the process values. In other words, the individual control processes or application programs can be executed by a common processing facility, such as a processor or a multiprocessor system. In this case, all control processes access a common data memory, such as a common RAM. The encoded processing of the process values enables it to be ensured that there is no mixing up of the process values.

In accordance with another embodiment, the number of control processes are performed based on an identical software code. In other words, the number of control processes are all based on an identical application program generated once for the control processes. Here, for each control process at least a part of the signature is individually generated. As a result, mix-ups between the encoded process values of the individual control processes can be excluded even when there is no individual encoding.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the invention will be explained below with the aid of the figures, in which.

DETAILED DESCRIPTION OF THE EXEMPLARY EMBODIMENTS

Figure 1:
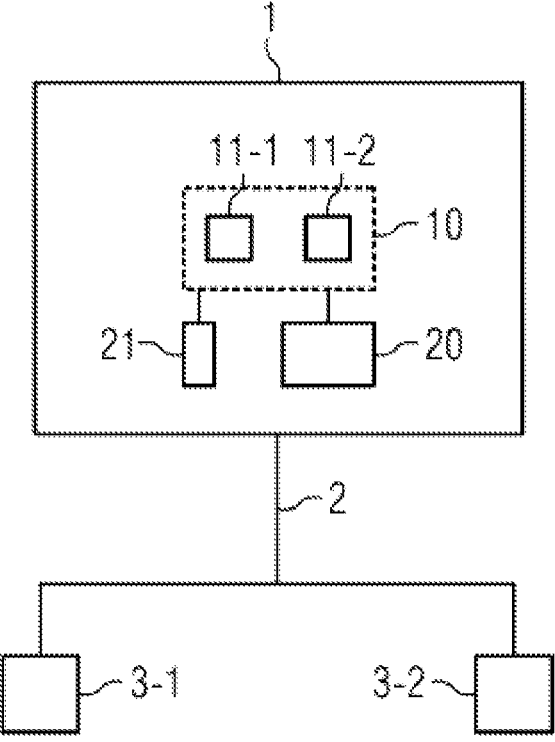
FIG. 1 shows a schematic block diagram of a process control system with an apparatus for control of a process plant in accordance with an embodiment of the invention.

FIG. 1 shows a schematic diagram of a basic block diagram for a process control system in accordance with one embodiment. This process control system can comprise a number of plants 3-1, 3-2. Each of these plants 3-1, 3-2 can be seen as an independent plant which, for example, can be controlled by an independent controller. Such plants can basically involve any given plant for control of a processor, for manufacturing of products or the like. Each of these plants 3-1, 3-2 can, for example, comprise one or more field devices, which can communicate with a corresponding controller.

In the process control system shown in FIG. 1, the plants 3-1, 3-2 are each controlled by control processes 11-1, 11-2, which are executed as application programs on common hardware in the form of an apparatus 1 for control of the process plant. The control processes 11-1, 11-2 of the apparatus 1 communicate here via a network 2 with the field devices of the individual plant 3-1, 3-2.

In this way, a hyper-convergent infrastructure can be created, in which the control processes 11-1, 11-2 are grouped together for a number of industrial plants 3-1, 3-2 in central hardware of the apparatus 1. The control processes 11-1, 11-2 can involve application programs, for example, which are executed by a processing facility 10, such as a microprocessor or a multiprocessor system. The individual control processes can be implemented as virtual controllers in the central hardware of the apparatus 1, for example.

The control processes 11-1, 11-2 here can particularly involve hardware-independent application programs. In particular, the control processes 11-1, 11-2 can be executed based on an identical application program generated once, where for each of the control processes 11-1, 11-2 the corresponding application program is executed once in the apparatus 1. The individual control processes 11-1, 11-2 here can also access a common memory 20 of the apparatus 1 in order to store or to read out data, such as process values or the like.

Due to safety aspects, the process values stored in the memory 20 of the apparatus 1 can be stored on an encoded basis. The processing of these process values by the individual control processes 11-1, 11-2 can also be performed, at least in part, based on the encoded process values.

What is known as a B signature can be provided for the encoding of the process values, for example, which for each process value is defined just once and can be signed based on the respective process value. Thus, a distinction can be made between individual process values by checking this B signature.

What is known as the D signature can further be provided, which is indeed the same for all process values of a control processes 11-1, 11-2 but is varied for each cycle of the cyclically executed application program, however. For this purpose, for example, starting from an initial value at the start of the control processes 11-1, 11-2 in each cycle of the control process, the value of this signature is increased by a predetermined increment. In this way, it is possible to check whether the process values signed hereby are up to date and outdated process values can be identified.

If, however, an identical application program generated once is used for a number of control processes 11-1, 11-2, thus not only are the B signatures for the corresponding process values the same in all control processes 11-1, 11-2, but also the initial values and the increment of the D signature could be the same in a number of parallel control processes 11-1, 11-2. Through this, the danger exists that a mixing up of process values between the individual control processes 11-1, 11-2, cannot be reliably recognized.

In order to counteract this danger, there is provision in the control processes 11-1, 11-2 in each case for providing an individual start value and/or an individual increment for the D signature modified with each cycle. In this way, a distinction can be made by this D signature between process values from different control processes 11-1, 11-2.

Basically, it is sufficient to define either the initial values or the increment for the D signature modified with each cycle individually for each control processes 11-1, 11-2. Above and beyond this, however, it is also possible to define the two individually, i.e. both the initial values and also the increment for each of the control processes 11-1, 11-2.

Described subsequently are a few possibilities for individually defining the initial value and/or the increment for such a D signature. For example, at a start of a control process 11-1, 11-2 the initial value for the D signature can be defined at random. For this, any given number of methods for creating a random number or a pseudo random number are possible. For example, such a number that appears to be random can be computed based on time information or another preferably complex variable value, such as a sensor value. In particular, for example, there can also be recourse to already existing functions for providing a number that appears to be random. Likewise, as an alternative or in addition, the described increment for the modification of the D signature can likewise also be determined for each cycle to be run based on a random number or a pseudo random number.

Over and above this, it is possible to determine the initial values and/or the increment based on any given suitable individual characteristics of the individual control processes 11-1, 11-2. For example, the values can be established based on an individual license key for each control process 11-1, 11-2. Furthermore, other software or hardware characteristics, such as an IP address and/or a virtual MAC address for a virtual network interface can be used. Also individual names or descriptions of the individual control processes 11-1, 11-2 can be used for the generation of the initial values and/or increments.

The data for the initial values as well as for the increment can be determined for each new start of the control processes 11-1, 11-2. Over and above this, it is also possible to determine these values just once during a first initialization of the control processes 11-1, 11-2 and subsequently store them in a remanent memory 21 of the apparatus 1. In this way, the data stored in the memory 21 can be read in during later start processes so that it is possible to dispense with a new determination of these values during the start of the control processes 11-1, 11-2.

As well as the described possibilities for determining the initial value and/or the increment at the start of a control process 11-1, 11-2, it is also possible, over and above this, to newly define the increment for the establishment of a new D signature in a new cycle for each cycle. For example, a new increment can be established for this based on a random number or the like in each cycle. Through this no specific measures are required when a cycle is run for the first time.

Through the inventive approach, it is thus possible to perform a number of control processes 11-1, 11-2 on a common hardware platform, where all these control processes can be executed on the basis of the same application program generated once. The adjustment of the loop-dependent D signature provided individually in control processes in this case enables a distinction to be made between encoded process values of the different control processes 11-1, 11-2.

Figure 2:
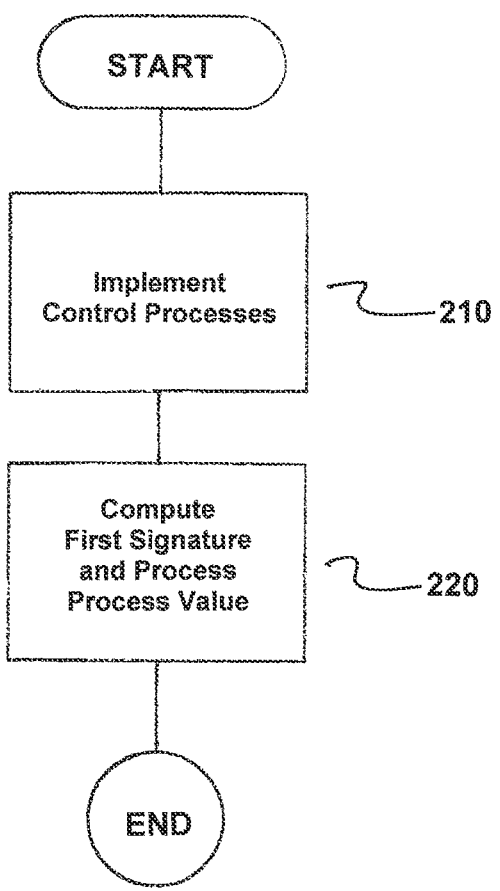
FIG. 2 is a flowchart of the method in accordance with the invention.

FIG. 2 is a flowchart of the method for control of a process plant. The method comprises implementing a plurality of control processes 11-1, 11-2 by a control apparatus on common hardware, as indicated in step 210. Here, each control process of the plurality of control processes 11-1, 11-2 implements cyclic processing of at least one process value.

Next, a first signature is computed and the at least one process value is processed using the computed first signature in each cycle for the at least one process value, as indicated in step 220. Here, the first signature is computed by a control process 11-1, 11-2 using a predetermined initial value and a cyclic increment.

In accordance with the inventive method, at least one of predetermined initial values and the cyclic increment of a respective control process is defined individually for each control process of the plurality of processes 11-1, 11-2 .

In summary, the disclosed embodiments of the present invention thus relate to an apparatus and method for control of a process plant, in which a number of control processes are executed on common hardware. Encoded process variables are encoded in this case in each of the control processes based on signatures that are defined individually in each of the control processes.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus for control of a process plant, comprising:
   a control apparatus configured to implement a plurality of control processes on common hardware, each control process performing cyclic processing of at least one process value;
   wherein the plurality of control processes each compute a first signature for the at least one process value and for carrying out the processing of the at least one process value using the computed first signature,
   wherein the plurality of control processes each compute the first signature using a predetermined initial value and a cyclic increment; and wherein each of the plurality of control processes defines at least one of initial values and the cyclic increment of the respective control processes individually;
   wherein the process plant is operated, cyclic processing of the at least one process value is performed, and the computed first signature is utilized in each cycle for the at least one process value to ensure integrity of process values across a plurality of virtualized control processes.

2. The apparatus as claimed in claim 1, further comprising:
   a storage facility which stores and provides at least one of the initial values and cyclic increments for the plurality of control processes on a remanent basis,
   wherein each of the plurality of control processes, during a first initialization, determine the at least one of initial values and the cyclic increment and stores said determined initial values and the cyclic increment in the storage facility.

3. The apparatus as claimed in claim 2, wherein each of the plurality of control processes, during a further initialization, determine the first signature using the initial value stored in the storage facility for at least one of a respective control process and a cyclic increment.

4. The apparatus as claimed in claim 1, wherein each of the plurality of control processes newly determine at least one of the initial values and the cyclic increment during each initialization.

5. The apparatus as claimed in claim 1, wherein each of the plurality of control processes compute at least one of the initial values and the cyclic increment of a respective control processes using a random value.

6. The apparatus as claimed in claim 1, wherein each of the plurality of control processes compute at least one of the initial values and the cyclic increment of a respective control processes using at least one of a hardware characteristic and a software characteristic of the respective control processes.

7. The apparatus as claimed in claim 1, wherein each of the plurality of control processes defines the cyclic increment in each cycle using a newly established random value.

8. The apparatus as claimed in claim 1, wherein the plurality of control processes each assign to the at least one process value a second signature and to perform processing of the at least one process value using the computed first signature and the second signature; and
   wherein the second signature of the at least one process value is the same for all cycles of the cyclic processing.

9. The apparatus as claimed in claim 1, further comprising:
   a data memory which stores process values of plurality of control processes and corresponding signatures for the process values;
   wherein the control apparatus comprises a processing facility which implements the plurality of control processes.

10. The apparatus as claimed in claim 1, wherein the plurality of control processes are each performed based on identical software code.

11. A process control system, comprising:
   an apparatus for control of a process plant as claimed in claim 1;
   a plurality of field devices, which each comprise at least one sensor and/or actuator;
   wherein the plurality of control processes of the control apparatus each at least one of (i) generate control commands using sensor values of the field devices and (ii) send control commands to the plurality of field devices.

12. A method for control of a process plant, comprising:

implementing a plurality of control processes by a control apparatus on common hardware, each control process of the plurality of control processes implementing cyclic processing of at least one process value;

computing a first signature and processing the at least one process value using the computed first signature in each cycle for the at least one process value, the first signature being computed by a control process using a predetermined initial value and a cyclic increment; and operating the process plant, performing the cyclic processing of the at least one process value and utilizing the computed first signature in each cycle for the at least one process value to ensure integrity of process values across a plurality of virtualized control processes;

wherein at least one of predetermined initial values and the cyclic increment of a respective control process is defined individually for each control process of the plurality of processes.

\* \* \* \* \*